Sept. 26, 1944.  E. R. SMITH  2,359,255
CONTROL MECHANISM FOR MACHINE TOOLS
Filed Nov. 21, 1941
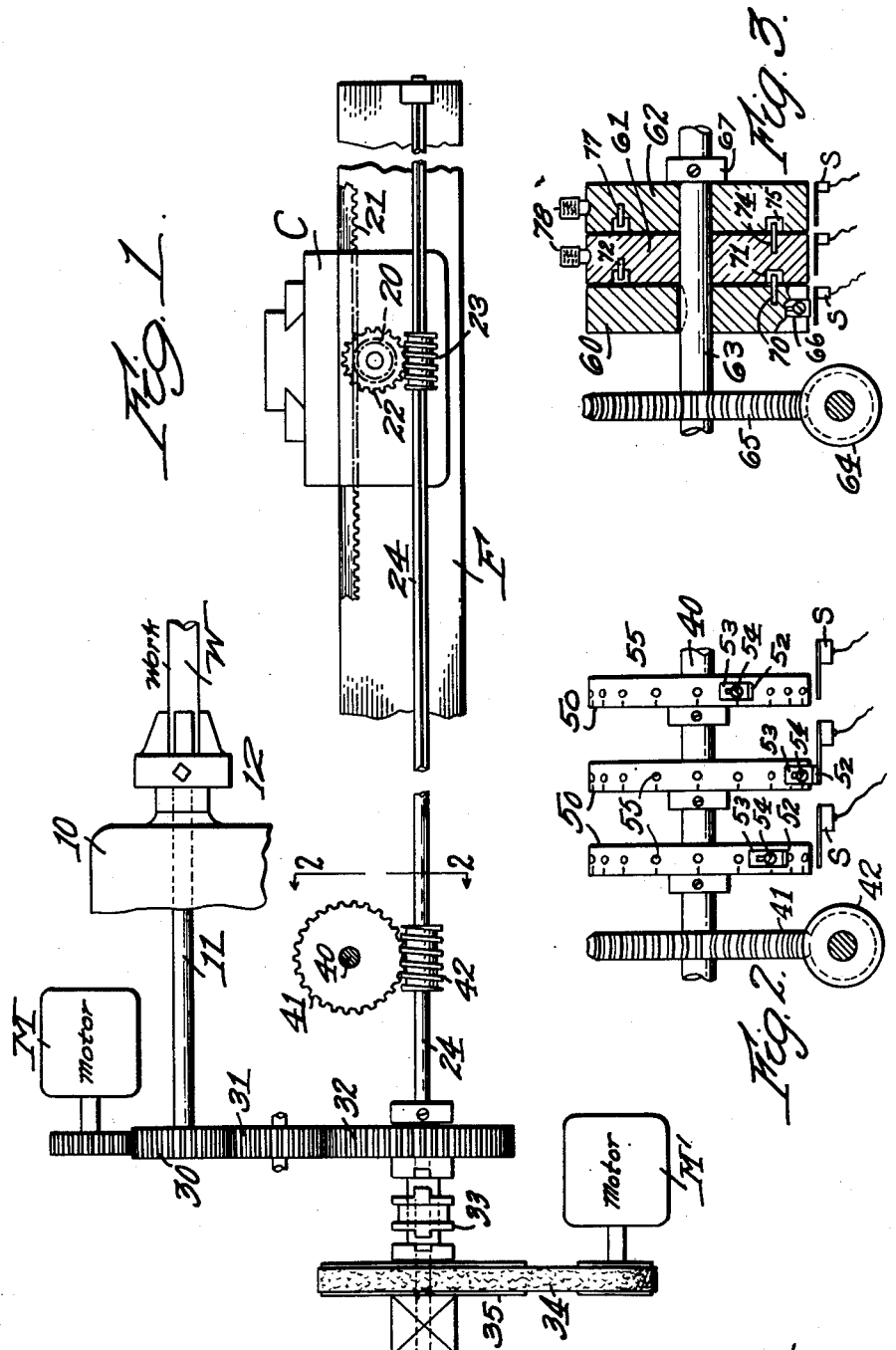

Patented Sept. 26, 1944

2,359,255

UNITED STATES PATENT OFFICE 2,359,255

CONTROL MECHANISM FOR MACHINE TOOLS

Edwin R. Smith, Seneca Falls, N. Y., assignor to Seneca Falls Machine Company, Seneca Falls, N. Y., a corporation of Massachusetts Application November 21, 1941, Serial No. 419,976

4 Claims. (Cl. 82—2)

This invention relates to machine tools, such as lathes or grinders, in which the work is rotated and in which a cutting tool or grinding element is mounted on a tool slide or carriage which is moved axially of the machine or work to effect a cutting or grinding operation.

In such machine tools, it is commonly necessary that certain changes in operation, such as advance or withdrawal of tools, or change or reversal of feed, take place in definite relation to the tool travel.

It is the general object of my present invention to provide control mechanism for a machine tool, so constructed and arranged that all necessary changes in operation of the machine may be automatically determined in direct reference to the longitudinal travel of the tool slide or carriage.

A further object of my invention is to so relate the travel of certain control devices to the travel of the tool slide or carriage that correct and accurate setting of said control devices may be facilitated. I also provide improved means by which extended tool carriage travel may be conveniently controlled without increase in size of the control devices.

My invention further relates to arrangements and combinations of parts which will be hereinafter described and more particularly pointed out in the appended claims.

A preferred form of the invention is shown in the drawing, in which

Fig. 1 is a partial front elevation of a machine tool embodying my invention;

Fig. 2 is a sectional side view of the control devices, looking in the direction of the arrow 2 in Fig. 1; and Fig. 3 is a view similar to Fig. 2 but showing a modified construction, partly in section.

Referring to Figs. 1 and 2, I have shown portions of a machine tool such as a lathe or grinder comprising a base or frame F having a head 10 in which a work spindle 11 is rotatably mounted. The work W is secured to the spindle 11 in any usual manner as by a chuck 12, with the other end of the work supported in some convenient manner, as on the usual tail stock, not shown. A motor M provides power for the spindle 11.

Any desired tool, such as a lathe tool or grinding wheel, is mounted on a tool carriage C having a pinion 20 engaging a rack 21 fixed to the frame F. The pinion 20 is rotated by a worm gear 22 engaged by a worm 23 keyed to the feed shaft 24 but slidable axially thereof with the carriage C. All of these parts are of the usual construction and in themselves form no part of my present invention.

The spindle 11 may be connected to the feed shaft 24 through gears 30, 31 and 32 and a clutch 33, or the shaft may be driven from a reversible auxiliary motor M' through a belt 34 and pulley 35. The gear 32 and pulley 35 are loose on the feed shaft 24 and the clutch member 33 is keyed to the shaft but slidable axially thereon. By shifting the clutch 33 to the right, a direct gear drive from the work spindle is achieved, and by shifting the clutch member 33 to the left, a high speed feed or return may be secured. The shifting of the clutch 33 may be controlled as hereinafter described.

For control of the machine tool, in coordination with the travel of the carriage C, I provide a shaft 40 connected by a worm gear 41 and worm 42 with the feed shaft 24 and rotatable in definite relation thereto. One or more control discs 50 are mounted on the shaft 40 and also rotate in fixed relation to the rotation of the feed shaft 24 and to the axial travel of the carriage C.

The control discs 50 are provided with lugs or projections 52, which may be secured in any desired positions on the peripheries of the discs 50. Any convenient means may be provided for thus securing the lugs or projections on the discs, such means being indicated in Fig. 2 as comprising slotted bases 53 for the lugs 52 and clamping screws 54 insertable in any selected threaded hole 55. Any other suitable adjusting and clamping devices may be substituted.

Control devices S are positioned for engagement by the lugs 52 and when thus engaged will effect certain predetermined changes in operation of the machine tool, such as changes in spindle speed, increase, decrease or reversal of carriage feed, advance or withdrawal of a tool, advance of a back rest to operative position, or any other desired change in operation.

The control devices S may comprise switches in electric circuits or may effect the desired changes through mechanical connections. Their specific structure and operation forms no part of my present invention.

For convenience in setting the lugs 52, it is desirable that the peripheries of the discs 50 be graduated, and it is also desirable, although not essential, that the driving connections be so arranged that one inch of travel on the periphery of the disc 50 shall correspond to one inch of travel of the carriage C. This relationship simplifies the setting of the lugs 52 to effect changes in operation at desired points and reduces the liability to mistakes due to errors in calculation.

With the construction above described, it is a very simple matter to selectively control the entire operation of a machine tool in relation to the travel of the carriage C, and to introduce any desired changes in operation at selected points in the carriage travel.

It will be noted that the driving connection between the carriage C and the disc 50 is positive, so that, when once adjusted, the lugs 52 will always become operative at the same points in the carriage travel.

If the machine tool is of such construction that there is excessive carriage travel, then the modified construction shown in Fig. 3 may be adopted. In this modified structure, control discs 60, 61 and 62 are mounted on a shaft 63 driven by a worm 64 through a worm gear 65, and said discs are provided with lugs 66, all as previously described.

The disc 60 is fixed to the shaft 63 and the discs 61 and 62 are loose on the shaft but are held in definite axial relation by collars 67. The disc 60 has a driving pin 70 which normally moves freely in an annular groove 71 in the adjacent face of the disc 61. Continued rotation of the disc 60, however, causes the pin 70 to engage a stud 72 in the disc 61, after which the disc 61 will rotate with the disc 60.

Similarly, a driving pin 74 in the disc 61 rotates freely in a groove 75 in the disc 62 until the pin engages a stud 77 in the disc 62, after which all three discs rotate in unison. Spring detents 78 hold the discs 61 and 62 from rotation, except when the driving studs are positively engaged.

With this construction, the disc 60 will perform almost a complete revolution before the disc 61 is started, and the disc 61 will similarly perform almost a complete revolution before the disc 62 is started. The lugs 66 can thus be attached to the discs in spaced relation to correspond to carriage travel equal to nearly three times the periphery of any one of the discs. Discs of reasonable size may accordingly be used to indicate extended carriage travel.

The provision of control discs rotating in fixed relation to carriage travel and effective to actuate any desired switches or other control devices at selected points greatly facilitates automatic operation of a machine tool, and particularly facilitates desired changes in carriage feed or spindle speed during a machine operation.

Having thus described my invention and the advantages thereof, I do not wish to be limited to the details herein disclosed, otherwise than as set forth in the claims, but what I claim is:

1. In a machine tool in which the work is rotated, in combination, a tool carriage, feeding means for said tool carriage, devices to control machine operations, control discs, control members mounted on said discs and actuating said control devices, means to rotate the first disc in fixed speed relation to the travel of said carriage, the remaining discs being initially stationary but becoming successively operative, and means to initiate rotation of each succeeding disc after a predetermined rotation of a preceding disc.

2. In a machine tool in which the work is rotated, in combination, a tool carriage, feeding means for said tool carriage, devices to control machine operations, control discs, control members mounted on said discs and actuating said control devices, means to rotate said discs in fixed speed relation to the travel of said carriage, and coacting devices on adjacent discs by which a first disc starts a second disc to rotate with said first disc after a predetermined rotation of said first disc.

3. In a machine tool, in combination, a sliding carriage, feeding means to slide said carriage, devices to control machine operations, actuating members to render said control devices operative, and positively and continuously operating driving connections between said actuating members and said feeding means effective to maintain fixed relative travel and the same relationship in direction of travel between said carriage and each actuating member at all times during the operation of the machine and of each actuating member.

4. In a machine tool, in combination, a sliding carriage, feeding means to slide said carriage, devices to control machine operations, control discs, control members detachably and adjustably mounted on said discs and actuating said control devices, and positive driving means to rotate said discs in fixed speed relation and in fixed direction relation to the travel of said carriage at all times during the operation of the machine and of each control member.

EDWIN R. SMITH.